Feb. 8, 1927.    I. F. STANLEY    1,617,034
TIRE CHAIN
Filed May 8, 1926

WITNESS: R. G. Thomas

I. F. Stanley, INVENTOR
BY Victor J. Evans, ATTORNEY

Patented Feb. 8, 1927.

1,617,034

UNITED STATES PATENT OFFICE.

ISAAC F. STANLEY, OF MANSET, MAINE.

TIRE CHAIN.

Application filed May 8, 1926. Serial No. 107,764.

This invention relates to a tire chain, the general object of the invention being to provide the chain with lugs which will be located on the tread portion of the tire and to each side of said tread portion.

Another object of the invention is to provide means whereby new links can be easily connected with the lugs when the old links have become worn.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
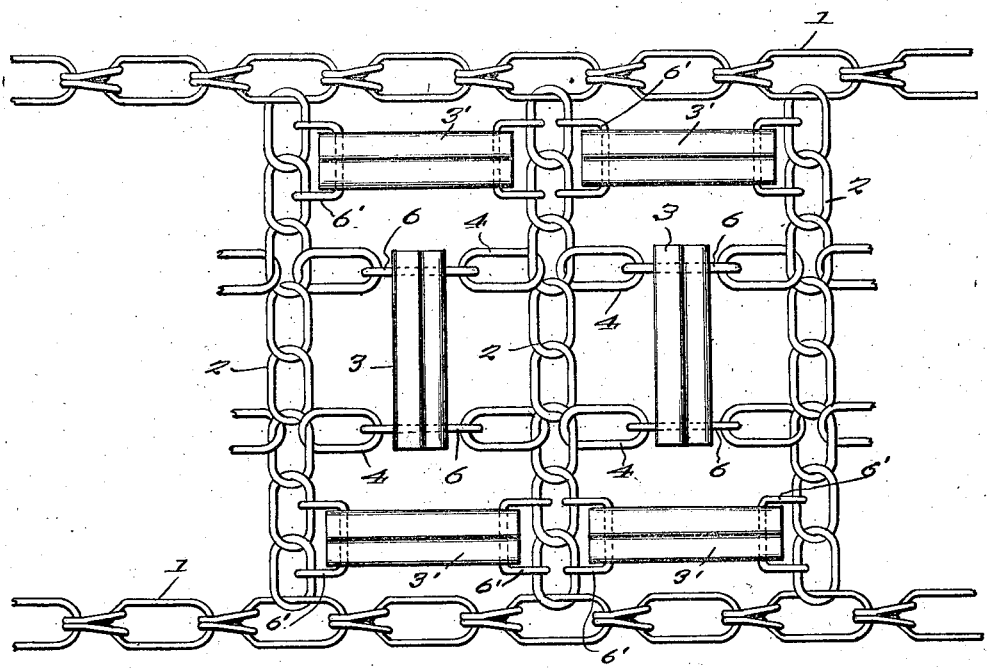
Figure 1 is a plan view of portion of the improved chain.
Figure 2:
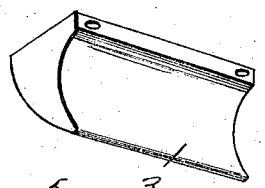
Figure 2 is a perspective view of one of the lugs.
Figure 3:
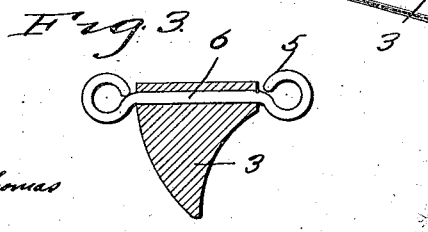
Figure 3 is a sectional view through one of the lugs.

In Figure 1, 1 indicates the pair of side chains which pass around the sides of the tire and have their ends suitably connected together to hold the device on a tire. These side chains are connected together by the cross chains 2. Located between each pair of cross chains is a transversely arranged lug 3 which is connected with the two cross chains by the links 4 which engage the eyes 5 on the bars 6 which pass through holes in the lug. These lugs parallel the cross chains and other lugs 3' parallel the side chains, each one of these lugs 3' being connected with a pair of cross chains 2 by the U-shaped bars 6' which pass through holes adjacent the ends of the lug and have eyes at their ends for engaging some of the links of the chains 2. The lugs are each of substantially wedge-shape in cross section, with one face convex and the other face concaved so as to give the lug the shape shown in Figures 2 and 3. This substantially hook shape will insure the lugs securing a firm grip in soft ground or in snow.

The lugs 3, it will be seen, will prevent spinning of a wheel in soft ground or on slippery surfaces, while the lugs 3' will prevent skidding or side slipping of the wheel. Of course, both sets of lugs will help to prevent spinning and skidding of the wheel. By making the links and bars as shown, new links can easily be substituted for old ones, when the old links have become worn.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tire chain of the class described comprising a pair of side chains, a plurality of cross chains, a transversely extending lug arranged between each pair of cross chains, links for connecting the lugs with the cross chains, a pair of longitudinally extending lugs between each pair of cross chains, each lug being arranged adjacent a side chain, means for connecting said lugs with the cross chains, each transversely and longitudinally extending lug being of wedge shape in cross section with one face convex and the other face concaved.

In testimony whereof I affix my signature.

ISAAC F. STANLEY.